Aug. 11, 1959   L. C. BACKER   2,898,945
PIPE COUPLING
Filed July 1, 1957
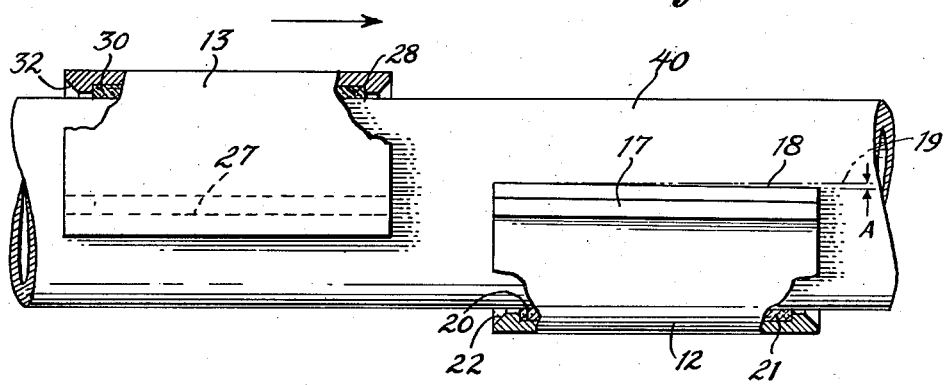
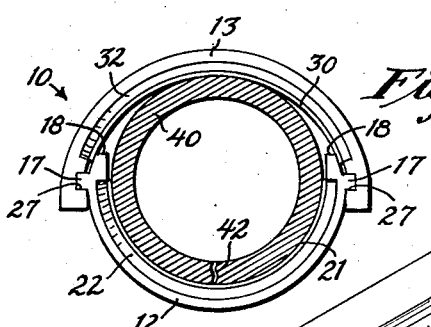
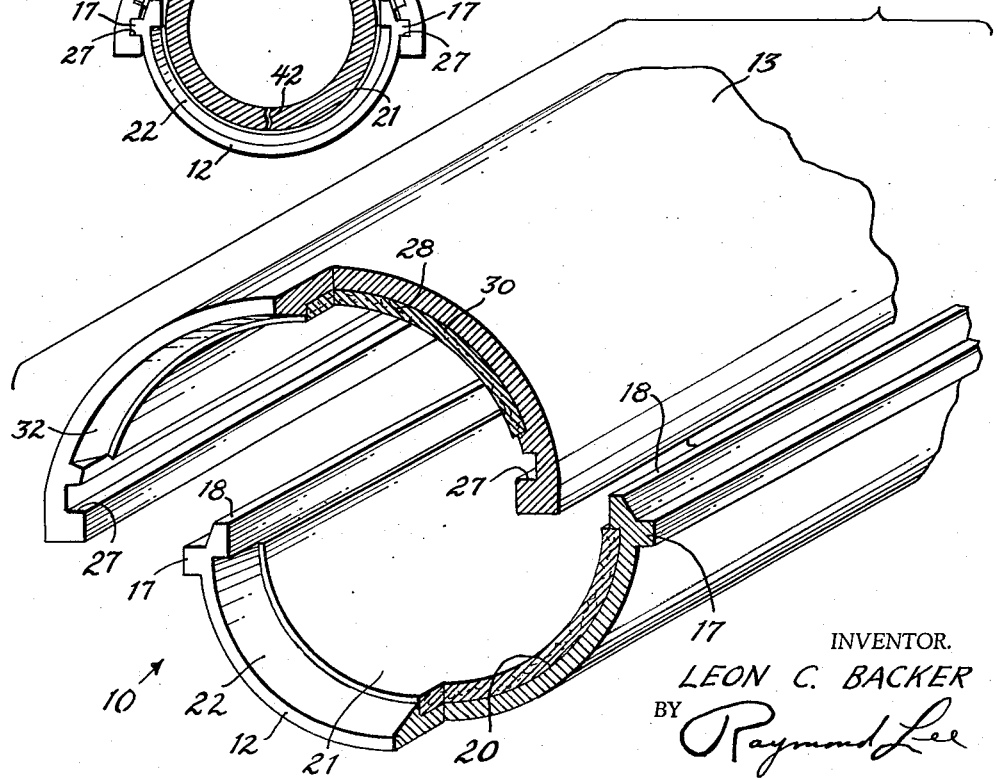
INVENTOR.
LEON C. BACKER
BY
ATTORNEY.

2,898,945
PIPE COUPLING

Leon C. Backer, Philadelphia, Pa.

Application July 1, 1957, Serial No. 668,934

2 Claims. (Cl. 138—99)

This invention relates to pipe couplers or sleeves adapted to couple together the ends of pipe sections or to repair leaking or weak parts of a continuous pipe.

It has been found that the usual delay between the time that a leak is first discovered in a pipe, conduit, or the like, and the time that the leak has been effectively stopped is often responsible for severe property damage and bodily injury. This is particularly true in such cases where the affected pipe or conduit is used for the pressurized flow of combustible materials, such as gasoline and fuel oil, in that such leak presents a fire hazard to all nearby equipment and workmen. While various types and couplings and clamps have been proposed for stopping such leaks, such are usually cumbersome to attach to the pipe and often require several individuals to effectively draw the parts together. In other instances, threaded bolt and nut means are necessary to secure the parts together which, in itself, consumes a considerable amount of time. It is therefore an object of the present invention to provide a pipe coupling device that is simple in construction, efficient in operation, and which may be quickly assembled to any affected pipe section in a quick and simple manner so as to overcome any of the aforementioned difficulties.

Another object of the present invention is to provide a coupler or pipe clamping sleeve having two major component parts, each being substantially semi-cylindrical in shape and slidable longitudinally relative to each other between a released and a clamping position independently of any additional fastening members.

Other objects of the invention are to provide a pipe coupling bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

Figure 1 is a side elevational view of a pipe coupling made in accordance with the present invention showing the manner in which it is moved into operative engagement with a conduit;

Figure 2 is a front elevational view of an assembled pipe coupling made in accordance with the present invention in operative association with a conduit, with parts broken away to show details of construction; and Figure 3 is an exploded perspective view, with parts broken away, of the components forming the structure in accordance with the present invention.

Referring now more in detail to the drawing, a pipe coupling 10 made in accordance with the present invention is shown to include a substantially semi-cylindrical base member 12 and a substantially semi-cylindrical draw member 13, both of which together form a substantially circular central bore for receiving a section of pipe therein. The base member has an inside diameter substantially equal to the outside diameter of the pipe with which it is to be assembled, while the draw member 13 has an inside diameter slightly larger than that of the base member in order to permit a certain amount of variance so as to permit the device to be used on pipe sections reasonably close to that intended.

The base member 12 is provided with a pair of diametrically opposite outwardly extending rails or tracks 17 which are inclined downwardly from one longitudinal end to the other of the base member. As is seen in Figure 1, the rails or tracks 17 define an angle A with the upper surface 18 of the base member. As will hereinafter be described, this angular relationship effects a clamping action between the parts for sealing any opening in the pipe section.

A recess 20 is defined within the inside surface of the base member 12 and is spaced inwardly from the longitudinal and lateral extremities of the base member so as to provide a pocket for receiving a gasket member 21 of any desired material, such as asbestos, leather, fiber, or the like. Any one or both ends of the base member 12 are provided with a flaired surface 22 for permitting the member to be moved longitudinally along a length of pipe without any resulting binding action therebetween. Since the gasket is recessed within the pocket formed by the recess 20, such movement will not unseat the gasket so that it is constantly maintained in proper operating position.

The draw member 13 is quite similar to base member 12 but is provided with a pair of diametrically opposite grooves 27 that extend longitudinally of the draw member 13 from one end to the other. These grooves are substantially parallel to the longitudinal axis of the draw member and are adapted to slidably receive the outwardly extending rails or tracks 17 of the base member 12. The inside surface of the draw member 13 is also provided with a central recess 28 that forms a pocket for securely receiving a gasket 30 therein. In a similar manner, at least the forward extremity of the draw member 13 is provided with a flaired surface for facilitating the sliding movement of the draw member along the length of the associated pipe section and with respect to the base member 12.

In actual use, as soon as a break or opening 42 is discovered in the pipe section 40, the base member is placed over the opening 42 so that it is substantially centered with respect to the base member gasket 21. By holding the base member 12 in place with one hand, the draw member 13 may be placed on the diametrically opposite side of the pipe 40 and moved into engagement with the back end of the rails 17. Upon continued forward movement of the draw member 13, the downwardly inclined rails 17 will be drawn upwardly through their engagement with the grooves 27 so as to increase the pressure of the gasket 21 against the opening of break 42 in the pipe. In view of the relatively slight incline, the parts can be sufficiently secured together by hand to temporarily stop the leak in the pipe, while any appropriate tool, such as a hammer or a press may be used to later draw the parts into even more secured engagement with each other.

It will be noted that these parts can be assembled by any one person using one hand to hold the base member 12 in place while the other hand is used to slide the draw member 13 into clamping engagement therewith. Since the grooves 27 are parallel to the longitudinal access of the draw member 13, either end of the draw member may be moved into engagement with the back end of the rails 17 so as to reduce the amount of time required to properly orientate the parts. Since the gaskets are already integrally secured within the respective base and draw members, they provide a satisfactory seal against substantially high pressures. In fact, sufficient clamping action can be obtained to actually force particles of the gasket material into closing engagement with the crack or break 42 of the pipe so that substantially no leakage is permitted. It will also be recognized that while this invention has been described in connection with the sealing in a break or opening in a pipe, this coupling can also readily be used to secure adjacent ends of pipe sections together in a simple and efficient manner. In view of the arrangement of the parts, the ends of the adjacent pipe sections may be relatively ragged since the gaskets in the base and draw members will substantially fill the spaces therebetween so as to provide uninterrupted pressurized flow therein.

While this invention has been described with particular reference to the construction shown in the drawings, it is to be understood that such is not to be construed as imparting limitations upon the invention, which is best defined by the claims appended hereto.

Having thus described my invention, I claim as new and desire to secure by Letters Patent:

1. A completely self contained pipe union comprising, in combination, a hollow semi-cylindrical base member and a hollow semi-cylindrical draw member of slightly larger diameter than and receiving the longitudinal edges of said base member to define a cylindrical sleeve having a substantially circular central bore, each one of said members having an interior facing seating surface slidably accommodating a cylindrical member therewithin, each said seating surface defining a central recess, a pair of gasket liners each securely seated within and completely filling each said recess, each said gasket liner projecting uniformly above the level of said seating surface a distance less than the depth of said recess, said base member having marginal longitudinal terminal portions slidably overlapping the longitudinal edges of said gasket liner carried by said draw member, first longitudinally extending fastening means disposed along diametrically opposite sides of said base member, second longitudinally extending fastening means disposed along diametrically opposite sides of said draw member slidably receiving said first fastening means, at least one of said fastening means being directed along a line defining an acute angle with the transverse central plane of said respective member and acting to draw said members together during relative sliding movement therebetween, said first fastening means comprising a pair of rails each extending along diametrically opposite sides of said base member and circumferentially spaced from said marginal longitudinal terminal portions of said base member, said second fastening means comprising a pair of inwardly opening grooves extending along diametrically opposite sides of said draw member slidably receiving said rails therewithin, whereby said draw member is drawn toward said base member during forward movement of said draw member relative to said base member with said marginal longitudinal terminal portions of said base member in frictional sliding engagement with said overlapped longitudinal edges of said gasket liner carried by said draw member.

2. A pipe union as set forth in claim 1, wherein at least the forward end of said base member has rigid portions defining an inwardly converging conical flare.

References Cited in the file of this patent

UNITED STATES PATENTS

| | | |
|---|---|---|
| 48,517 | Chambers | July 4, 1865 |
| 549,594 | Cooper | Nov. 12, 1895 |
| 710,721 | Sindelar | Oct. 7, 1902 |
| 725,610 | Wossoff | Apr. 14, 1903 |
| 924,262 | Moll | June 8, 1909 |
| 982,028 | Austin | Jan. 17, 1911 |
| 1,928,570 | Mustico | Sept. 26, 1933 |
| 2,120,184 | Mojonnier | June 7, 1938 |
| 2,173,399 | Mills | Sept. 19, 1939 |